(12) United States Patent
Tokuhara

(10) Patent No.: US 7,107,361 B2
(45) Date of Patent: Sep. 12, 2006

(54) COUPLED COMPUTERS AND A METHOD OF COUPLING COMPUTERS

(76) Inventor: Tsunemi Tokuhara, 3-19-6, Sakaechoh, Kodaira-shi, Tokyo (JP)

( * ) Notice: Subject to any disclaimer, the term of this patent is extended or adjusted under 35 U.S.C. 154(b) by 897 days.

(21) Appl. No.: 10/025,885

(22) Filed: Dec. 26, 2001

(65) Prior Publication Data

US 2002/0099859 A1  Jul. 25, 2002

(30) Foreign Application Priority Data

Dec. 28, 2000  (JP)  ............................. 2000-400870

(51) Int. Cl.
*G06F 9/28* (2006.01)
*G06F 13/00* (2006.01)
*G06F 13/14* (2006.01)

(52) U.S. Cl. .......................... 709/253; 712/10; 712/32; 712/245; 710/306

(58) Field of Classification Search ................ 709/230, 709/253, 215, 212, 205; 711/146, 147, 153; 718/105; 713/185; 712/10, 32, 245; 710/306
See application file for complete search history.

(56) References Cited

U.S. PATENT DOCUMENTS 5,867,704 A * 2/1999 Tanaka et al. .............. 718/105
6,446,208 B1 * 9/2002 Gujar et al. ................ 713/185
6,510,496 B1 * 1/2003 Tarui et al. ................ 711/147
6,590,633 B1 * 7/2003 Nishi et al. .................. 355/53
6,714,983 B1 * 3/2004 Koenck et al. ............. 709/230

* cited by examiner

*Primary Examiner*—David Wiley
*Assistant Examiner*—Jude J. Jean-Gilles
(74) *Attorney, Agent, or Firm*—Wenderoth, Lind & Ponack, L.L.P.

(57) ABSTRACT

The present invention provides coupled-type computers wherein a computer can be coupled with computers of the same structure easily, and can be coupled with other computers of the same structure in high density. Computer components such as CPUs or memories are built in a holder made of polyhedron cube. A radio propagation bus space formed by a cavity is provided in the inside of the holder, and a plurality of radio-electric signal interconversion elements provided with a signal identification means facing the radio propagation bus space are disposed in the holder. These radio-electric signal interconversion elements are connected to the computer components in the holder. Holes communicating with the radio propagation bus space are bored on the surfaces of the outsides of the holders by means of the radio lines. When the holes of the holders are matched by causing a plurality of the holders of the same structure to be adjacent to one another, the radio propagation bus space in a plurality of the holders are mutually communicated through the matched holes, and the computer components in each holder are coupled by means of the radio by causing the plural holders to be adjacent to one another.

10 Claims, 4 Drawing Sheets

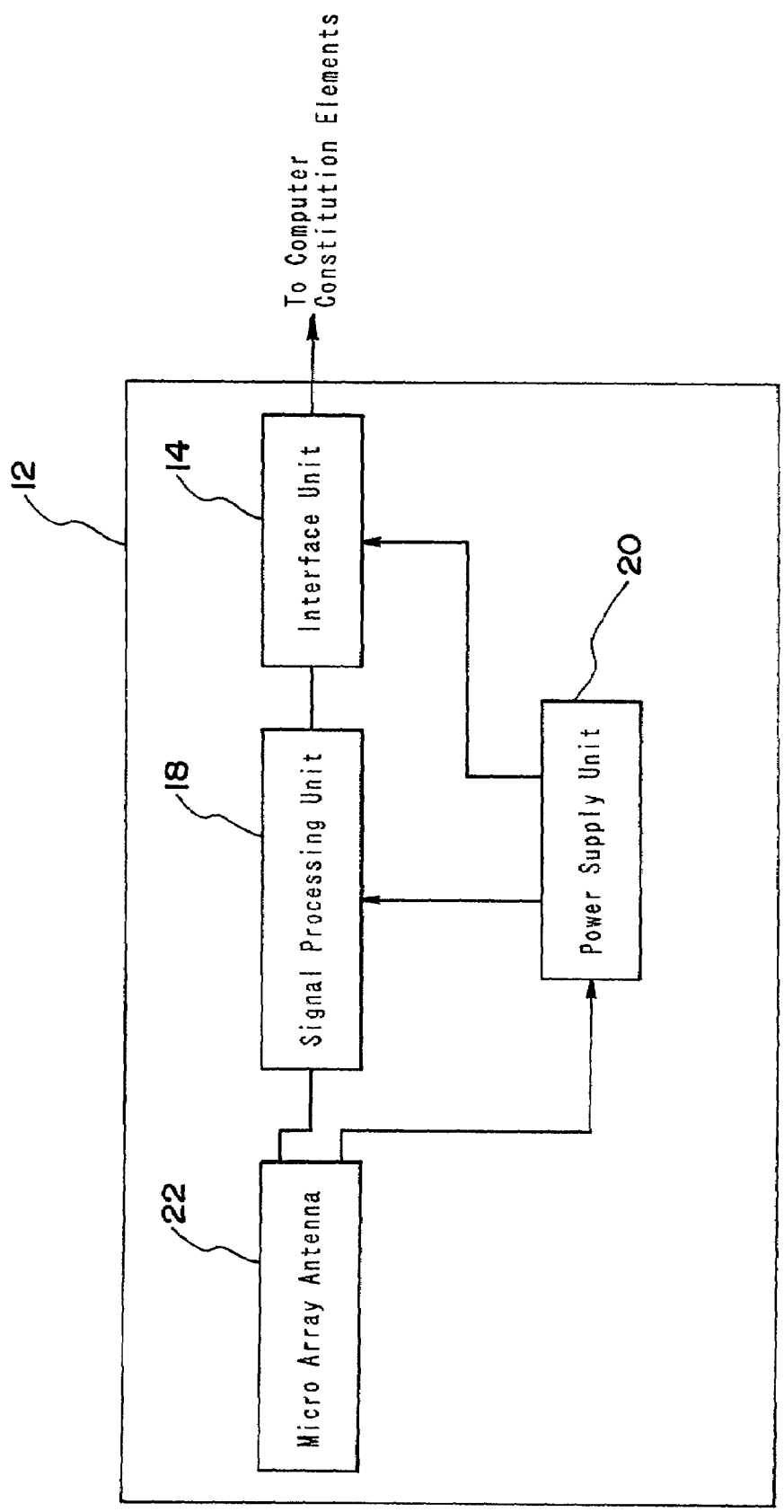

COUPLED COMPUTERS AND A METHOD OF COUPLING COMPUTERS

BACKGROUND OF THE INVENTION

1. Field of the Invention

The present invention relates to coupled computers forming coupled computers which are capable of conducting a transfer of a large amount of data with each other, and a method of coupling the computers.

2. Description of the Related Art

Heretofore, a large number of computers have been coupled to form an ensemble-type super computer, and this aggregate of computers is used as a server forming a data center of an ASP (Application Service Provider) or is used as a super computer performing a large scale scientific calculation. The coupling between each computer is generally served by codes.

In a case where an ensemble-type super computer is formed by forming a cluster connection of a large number of computers, the volume of such an ensemble of an entire super computer becomes an enormous size which is extremely inconvenient.

Furthermore, there exists a problem in that the codes coupling each computer become a huge volume which makes an entire accommodating space big. Moreover, there exists a problem in that a linking operation of each computer was extremely cumbersome as well as time consuming.

An object of the present invention is therefore to solve the foregoing problems.

SUMMARY OF THE INVENTION

The present invention provides coupled type computers wherein a computer is coupled to another computer of an identical structure easily, and moreover, is coupled to another computer with the same structure in high density without requiring codes.

The present invention is provided with built-in computer components such as CPU, memory and the like in a holder formed by a polyhedron cube. The present invention forms a radio propagation bus space consisting of a cavity in the interior of the holder, and a plurality of radio-electric signal interconversion elements provided with a signal identification means is installed in the holder which faces the radio propagation bus space. These radio-electric signal interconversion elements are connected to the computer components in the holder to form a holder. An opening is formed on the surface of the outside of the holder to form a hole for communicating with the radio propagation bus space through a radio line. In case a plurality of the holders of the same structure are arranged to be side by side to match the holes of the holders, the radio propagation buses in the plurality of the holders are arranged so as to be mutually communicated with each other through the matched holes, and as a result, the computer components in each holder are linked by means of the radio by the arrangement of the plurality of holders being disposed contiguous to each other.

BRIEF DESCRIPTION OF THE DRAWINGS

FIG. 4 shows a block explanatory drawing of radio-electric signal interconvsersion elements.

DETAILED DESCRIPTION OF THE INVENTION

The embodiments of the present invention will now be described in detail with reference to the attached drawings.

Figure 1:
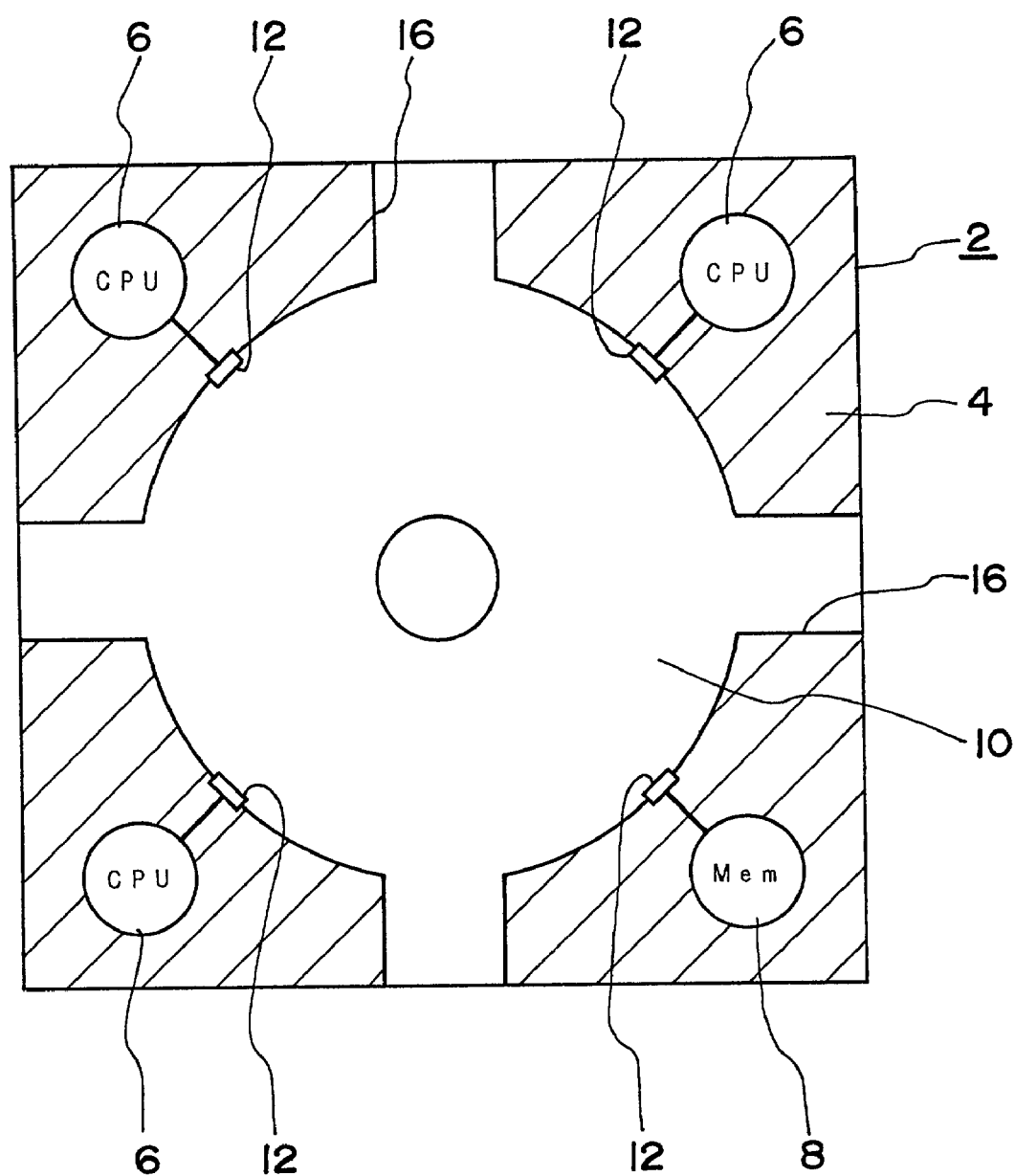
FIG. 1 shows a crossectional explanatory drawing of coupled-type computers according to the present invention.
Figure 2:
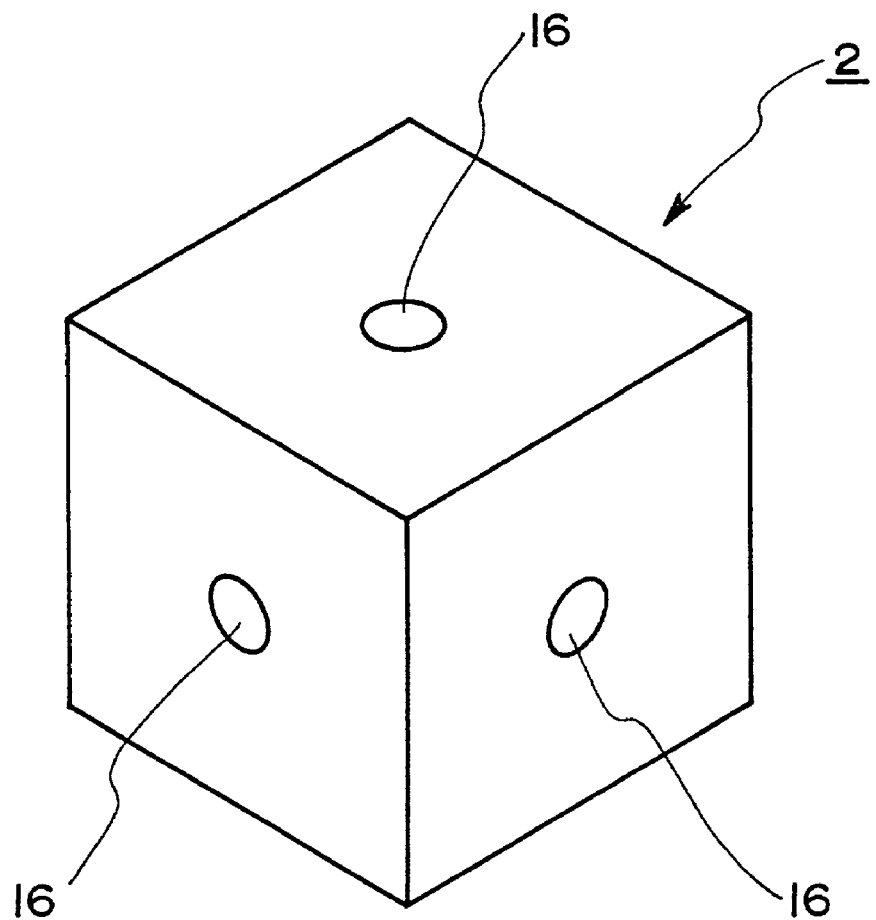
FIG. 2 shows an explanatory exterior appearance drawing of the coupled-type computers according to the present invention.

In FIG. 1, reference numeral (2) shows coupled-type computers, wherein computer components which are necessary for constituting a server such as a plurality of CPUs (6) (central processing unit), a memory (Mem) (8), a switching regulator (not shown) and the like are built in a cubic holder (4) consisting of silicone and other similar materials.

A radio propagation bus space (10) consisting of a spherical cavity is formed in the center of the interior of the holder (4). A plurality of radio-electric signal interconversion elements (12) are disposed in the inside portions of the holder (4) which face the radio propagation bus space (10), and an interface unit (14) (see FIG. 4) of each radio-electric signal interconversion element (12) is connected to an input/output of the components of the computer such as a corresponding CPU (6), memory (8), and the like. A plurality of radio lines (16) consisting of columnar holes are formed on the cubic holders (4).

The opening portion of each radio line (16) opens to the center of each hexahedron of the holder (4), and each radio line (16) is communicated with the radio propagation bus space (10) of the inside of the holder (4). The radio propagation bus space (10) and the radio line (16) constitute a radio propagation space for propagating the radio (including light) emitted from the radio-electric signal interconversion element (12) in a predetermined direction while reflecting the radio.

As illustrated in FIG. 4, the radio-electric signal interconversion element (12) comprises an interface unit (14), a transmission/reception signal processing unit (18), a feeding unit (20), and a transmission/reception microarray antenna (22). These units are chipped, and are fixed to the holder (4). The transmission/reception signal processing unit (18) constitutes a signal discrimination means for performing an extraction of identification information contained in the reception signal, and a selection of the reception signal. Furthermore, the transmission/reception signal processing unit (18) performs an error processing of the transmission/reception signal and multi-pass and a fusing countermeasure and the like.

In the foregoing construction, a plurality of the CPU (6) memories (8) in the single holder (4) are mutually connected in a spacewise manner by means of the radio propagation bus space (10), and as a whole, form a parallel computer. In the single holder (4), the CPU (6) sends the radio to the opposite CPU (6) through the radio-electric signal interconversion element (12) and also receives the reception signal from the opposite CPU (6) through the radio-electric signal interconversion element (12).

At this time, a signal processing unit (18) of the radio-electric signal interconversion element (12) connected to a plurality of the CPUs (6) that handle the information processes ID information, a channel and a time slot, and selects a receiving unit. The memory (8) can be read and written from the CPU (6) by the radio propagating over the radio propagation bus space (10) as if the memory (8) were connected to the bus.

Figure 3:
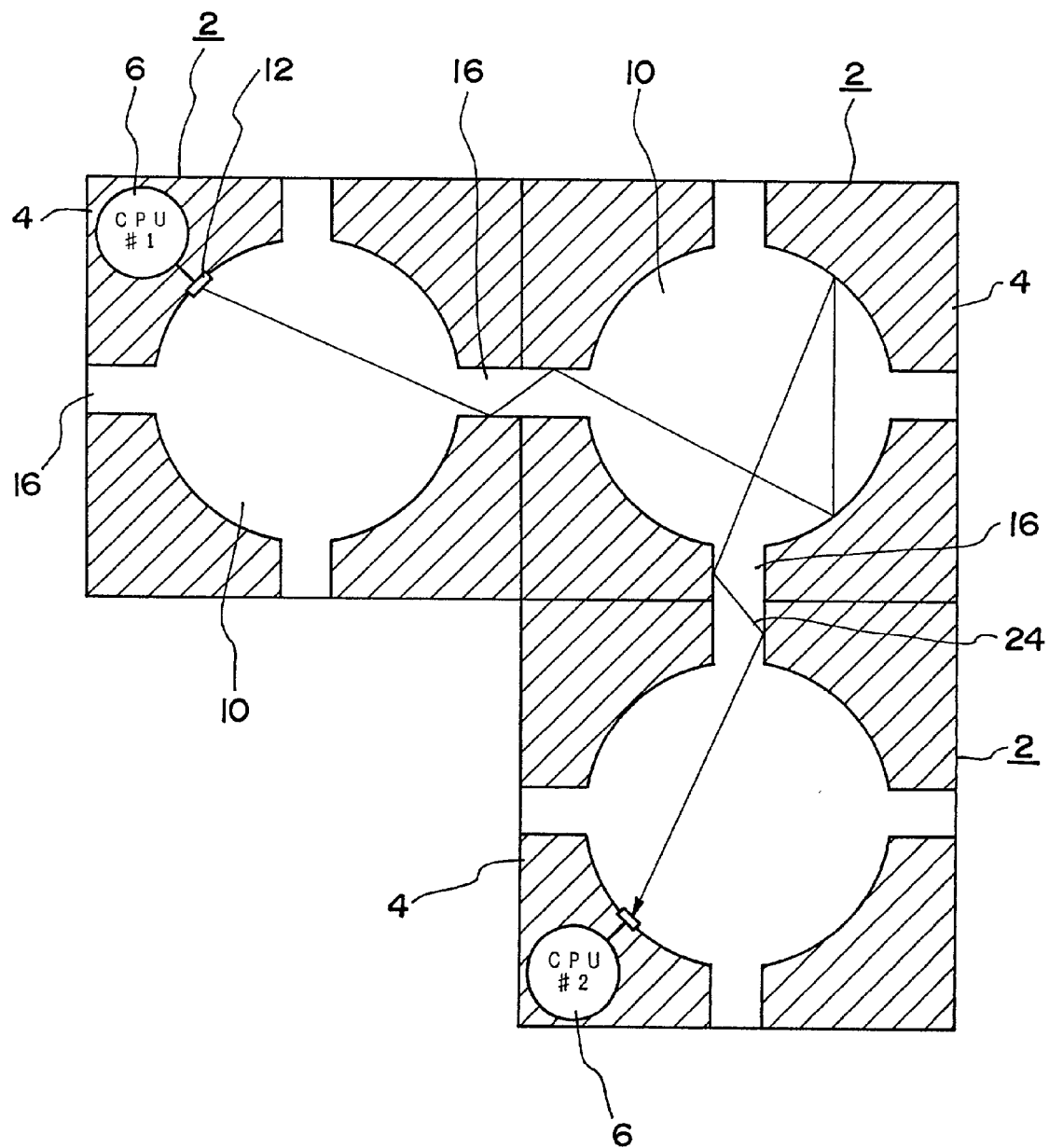
FIG. 3 shows a cross-sectional explanatory drawing of the ensemble-type computers formed by the coupled-type computers according to the present invention.

As illustrated in FIG. 3, each of a plurality of the holders (4) of the same structure, when they are laid one on top of another and being adjacent to each other, which constitutes a cubic shape as a whole, and the radio lines (16) opening to the adjacent surfaces of the adjacent holder (4) are mutually in tight contact and are communicated, whereby the radio propagation bus spaces (10) of the inside of the adjacent holders (4) are mutually communicated.

A computer component of one holder (4) among a plurality of the holders (4) that are coupled like a pair to form a cubic shape can mutually perform an exchange of data of the computer component of a desired other holder (4) through the radio line (16) and the radio propagation bus space (10).

As shown in FIG. 3, the radio (24) propagated from the CPU #1 (6) in one holder (4) among a plurality of the holders (4) through the radio-electric signal interconversion element (12) is transmitted to the desired CPU #2 (6) while reflecting the radio propagation space formed by the radio propagation bus space (10) and the radio line (16).

In the radio propagation space where a plurality of holders (4) are mutually communicated, a medium for cooling is caused to flow, and the computer component such as the CPU (6) or the memory (8) and the like which approaches or faces the cavity, namely, the radio propagation bus space (10), are cooled. Furthermore, a power source energy is fed to the radio propagation bus spaces (16) and cavity (10) by using the radio, and the power source energy is supplied to the computer component such as each CPU (6) or memory (8) and the like through the radio-electric signal interconversion element (12).

For reference, in this embodiment, the shape of the holder is assumed to be of a cubic type, but it is not particularly limited to a cube, and any shape may be chosen as long as the cavity (10) is provided for joint use through the radio line (16) in each holder.

The present invention has been constructed as described in the foregoing, and there are many effects such as a great many computers can be coupled in high density in a compact space, and moreover the codeless mode can be applied to this system.

What is claimed is:

1. Coupled-type computers in which computers of a same structure are coupled to form an ensemble-type computer, said ensemble-type computer comprising:
   a holder formed by a hexahedral polyhedron cube;
   a plurality of computer components housed in said holder;
   a radio propagation bus space formed by a cavity provided in an inside region of said holder;
   a plurality of radio-electric signal interconversion elements operable to identify a signal, said plurality of radio-electric signal interconversion elements being respectively connected to corresponding computer components among said plurality of computer components, and said plurality of radio-electric signal interconversion elements each being disposed so as to face said radio propagation bus space in said holder; and
   a plurality of radio lines provided on said holder, said plurality of radio lines being operable to communicate by radio propagation with said radio propagation bus space such that said plurality of radio lines are mutually communicated with said plurality of radio-electric signal interconversion elements, wherein:
   holes provided on each surface of said holder open said radio propagation bus space to each surface of said holder;
   the holes provided on each surface of said holder enable said plurality of radio lines of said holder to mutually communicate with a plurality of radio lines of at least one other identically structured holder that is placed side-by-side with said holder by arranging said radio propagation bus space of said holder to communicate with a radio propagation bus space of the at least one other holder placed side-by-side with said holder; and
   each of said computer components housed in said holder is operable to perform data exchange with computer components of the at least one other holder placed side-by-side with said holder through transmission and reception of radio by said plurality of radio-electric signal interconversion elements respectively corresponding to each of said computer components.

2. Coupled-type computers according to claim 1, wherein said plurality of computer components are at least one of a CPU and a memory.

3. Coupled-type computers according to claim 1, wherein said plurality of computer components are disposed in proximity of said radio propagation bus space, and a medium for cooling is caused to flow to said radio propagation bus space and said plurality of radio lines.

4. Coupled-type computers according to claim 1, wherein the radio transmitted and received by said plurality of radio-electric interconversion elements provide power source energy, the radio is emitted to said radio propagation bus space, and the power source energy is supplied to said plurality of computer components.

5. Coupled-type computers according to claim 1, wherein the holes provided on each surface of said holder are bored in a center of each surface to allow communication between said radio lines and the holes.

6. A method of coupling computers, said method comprising:
   housing a plurality of computer components in a holder formed by a hexahedral polyhedron cube;
   forming a radio propagation bus space composed of a cavity in an inside region of the holder;
   disposing a plurality of radio-electric signal interconversion elements for identifying a signal so as to face the radio propagation bus space in the holder;
   connecting the plurality of radio-electric signal interconversion elements to the plurality of computer components housed in the holder, respectively;
   forming a plurality of radio lines on the holder, the plurality of radio lines being formed to communicate by radio propagation with the radio propagation bus space such that the plurality of radio lines are mutually communicated with the plurality of radio-electric signal interconversion elements;
   opening holes on each surface of the holder to open the radio propagation bus space to each surface of the holder by means of the radio lines formed in the holder;
   matching the holes of the holder with holes of at least one other identically structured holder that is placed side-by-side with the holder so as to enable the plurality of radio lines of the holder to mutually communicate with a plurality of radio lines of the at least one other holder by arranging the radio propagation bus space of the holder to communicate with a radio propagation bus space of the least one other holder; and
   coupling the computer components housed in the holder with computer components housed in the at least one other holder to enable data exchange between the computers housed in the holder and the computer components housed in the at least other holder through transmission and reception of radio by the plurality of radio-electric signal interconversion elements.

7. A method of coupling computers according to claim 6, wherein the plurality of computer components are at least one of a CPU and a memory.

8. A method of coupling computers according to claim 6, wherein the plurality of computer components are disposed in proximity of the radio propagation bus space, and a medium for cooling is caused to flow to the radio propagation bus space and the plurality of radio lines.

9. A method of coupling computers according to claim 6, wherein the radio transmitted and received by the plurality of radio-electric interconversion elements provide power source energy, the radio is emitted to the radio propagation bus space, and the power source energy is supplied to the plurality of computer components.

10. A method of coupling computers according to claim 6, wherein the holes formed on each surface of the holder are bored in a center of each surface to allow communication between the radio lines and the holes.

* * * * *